(12) United States Patent
Chen et al.

(10) Patent No.: US 7,899,228 B2
(45) Date of Patent: Mar. 1, 2011

(54) LINE STRUCTURE DETECTION AND ANALYSIS FOR MAMMOGRAPHY CAD

(75) Inventors: Shoupu Chen, Rochester, NY (US); Daoxian Heidi Zhang, Los Gatos, CA (US); Yajie Sun, Foster City, CA (US); Yong Chu, Rochester, NY (US); Lawrence A. Ray, Rochester, NY (US); Yang Zheng, San Jose, CA (US); Yue Shen, Glendale, CA (US)

(73) Assignee: Carestream Health, Inc., Rochester, NY (US)

( * ) Notice: Subject to any disclaimer, the term of this patent is extended or adjusted under 35 U.S.C. 154(b) by 814 days.

(21) Appl. No.: 11/834,243

(22) Filed: Aug. 6, 2007
(Under 37 CFR 1.47)

(65) Prior Publication Data

US 2009/0041326 A1 Feb. 12, 2009

(51) Int. Cl.
*G06K 9/00* (2006.01)
*A61B 6/00* (2006.01)

(52) U.S. Cl. .................... 382/128; 382/219; 378/4

(58) Field of Classification Search .......... 382/128, 382/129, 130, 131, 132, 133, 134, 168, 156, 382/170, 181, 190–195, 199, 209, 219, 232, 382/255, 274, 276, 305, 312; 378/4, 20, 378/21, 28

See application file for complete search history.

(56) References Cited

U.S. PATENT DOCUMENTS

| | | | | |
|---|---|---|---|---|
| 6,137,898 A * | 10/2000 | Broussard et al. | | 382/132 |
| 6,748,044 B2 * | 6/2004 | Sabol et al. | | 378/4 |
| 6,819,790 B2 * | 11/2004 | Suzuki et al. | | 382/156 |
| 7,308,126 B2 * | 12/2007 | Rogers et al. | | 382/132 |
| 7,593,561 B2 * | 9/2009 | Zhang et al. | | 382/130 |
| 7,783,089 B2 * | 8/2010 | Kaufhold et al. | | 382/128 |
| 2002/0159622 A1 * | 10/2002 | Schneider et al. | | 382/128 |

OTHER PUBLICATIONS

Shoupu Chen et al., "Linear Structure Verification In Medical Applications," U.S. Appl. No. 60/954,153, filed Aug. 6, 2007.
Reyer Zwiggelaar et al., "Finding Orientated Line Patterns in Digital Mammographic Images," Proc. 7$^{th}$ Br. Machine Vision Conf., 1996, pp. 715-724.
R. Kimmel et al., "On Edge Detection, Edge Integration and Geometric Active Contours," Proceedings of Int. Symposium on Mathematical Morphology, ISMM2002, Sydney, New South Wales, Australia, Apr. 2002, pp. 37-45.
Michal Holtzman-Gazit et al., "Segmentation of Thin Structures in Volumetric Medical Images," IEEE Trans Image Process, Feb. 2006, 15(2).

* cited by examiner

*Primary Examiner* — Seyed Azarian (57) ABSTRACT

A method for image linear structure detection in medical imaging. The method includes locating microcalcification (mcc) candidate spots in a mammographic image; forming candidate clusters; assigning ranks to the candidate clusters; identifying linear structures in the neighborhood where the candidate clusters reside; and altering the ranks of the candidate clusters for which linear structures have been identified in the neighborhood.

19 Claims, 8 Drawing Sheets

LINE STRUCTURE DETECTION AND ANALYSIS FOR MAMMOGRAPHY CAD

CROSS REFERENCE TO RELATED APPLICATIONS

Reference is made to commonly assigned application U.S. Ser. No. 12/058,803, entitled "LINEAR STRUCTURE VERIFICATION IN MEDICAL APPLICATIONS", and filed on common date herewith in the names of Chen et al., and which is assigned to the assignee of this application.

FIELD OF THE INVENTION

The invention relates generally to computer aided cancer detection, and in particular, to mammography CAD.

BACKGROUND OF THE INVENTION

Digital or film-based mammography is widely employed for breast screening to reduce the cancer mortality among women. A sizable percentage of abnormality in mammograms are comprised of microcalcifications (mcc) that are deposits of calcium in breast carcinoma. A given cluster of microcalcifications might be associated with a malignant or benign case. Distinguishing between malignant and benign clusters is difficult and time-consuming for radiologists, which may lead to a high rate of unnecessary biopsies that may be avoided or at least minimized if a computer aided detection (CAD) mammography system is employed in diagnosis. Thus, it is beneficial to design the CAD algorithm in such a way that a high true-positive (TP) rate can be achieved while the number of false positives (FP) is kept to a minimum.

It is noted that some false-positive microcalcification (mcc) candidates as selected by some mammography CAD systems were found to fall on the curvilinear normal structures in digital or film-based mammograms. Researchers in the medical imaging community have been investigating methods of identifying curvilinear structures in mammograms in order to remove microcalcification candidates that are fall on the curvilinear structures so that false positives can be reduced.

Various methods for extracting curvilinear structures have been proposed in the past. Zwiggelaar, Parr, and Taylor (R. Zwiggelaar, T. C. Parr, and C. J. Taylor, "Finding orientated line patterns in digital mammographic images," *Proc. 7th Br. Machine Vision Conf.*, 1996, pp. 715-724) have compared the performance of several different approaches to the detection of linear structures in mammographic images. Results obtained using synthetic images suggest significant differences between the different approaches. Approaches based on the Orientated Bins method that produces the best line orientation results and the Line Operator method that produces the best line strength results have been evaluated by Zwiggelaar et al. One approach has been implemented as a multi-scale operator and gives intuitively convincing results. The output could be used directly in existing algorithms for classifying linear structures and their spatial patterns.

U.S. Patent Application Publication No. U.S. 2002/0159622 (Alexander Schneider et al.) is directed to a system and method for detecting lines in medical images. A direction image array and a line image array are formed by filtering a digital image with a single-peaked filter, convolving the resultant array with second-order difference operators oriented along the horizontal, vertical, and diagonal axes, and computing the direction image arrays and line image arrays as direct scalar functions of the results of the second order difference operations.

The aforementioned methods demonstrate limited success with regard to efficacy and efficiency because of the enormous variations of curvilinear structures to be detected in terms of shape geometric, topological properties and pixel luminance properties.

Therefore, an improved general approach of image linear structure detection in mammography is needed. The present invention is designed to overcome the problems set forth above.

SUMMARY OF THE INVENTION

According to one aspect of the present invention, the invention resides in a method for image linear structure detection in medical imaging. This method includes the steps of locating microcalcification (mcc) candidate spots in a mammographic image; forming candidate clusters each of which has a plurality of mcc candidate spots; assigning ranks to the candidate clusters based on the degree of similarity between the candidate clusters and true mcc clusters; identifying linear structures only in the neighborhood where the candidate clusters reside; and potentially altering the ranks of the candidate clusters for which linear structures have been identified in the neighborhood.

According to another aspect of the invention, the invention resides in a method for identifying linear structures that associated with mcc candidate clusters in mammographic images. This method includes the steps of locating mcc candidate spots in a mammographic image; forming candidate clusters each of which has a plurality of mcc candidate spots; assigning ranks to the candidate clusters based on the degree of similarity between the candidate clusters and true mcc clusters; for each mcc candidate cluster whose rank is not within a specified range, determining a region of interest (ROI); processing the ROI to generate a line mask if linear structures present in the ROI; and updating the rank of the mcc candidate cluster if it is determined that the mcc candidate cluster is associated with the generated line mask.

According to still another aspect of the invention, the invention resides in a method of an mcc candidate cluster driven linear structure detection in mammographic images. This method includes the steps of locating a plurality of mcc candidate clusters whose characteristics resemble that of true mcc clusters; extracting ROIs in the mammographic image with the geometric parameters of the located mcc candidate clusters; processing the ROIs to generate line masks; analyzing the ROIs to verify the truthfulness of the generated line masks; tagging the mcc candidate clusters that are associated with the verified line masks for diagnosis.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

In one embodiment of the method of image linear structure detection of the present invention, the mammographic image is a digitized X-ray film mammogram in the present invention; the mammographic image is a digital mammogram captured with a computerized radiography system in the present invention; the mammographic image is a digital mammogram captured with a digital radiography system in the present invention.

The step of locating microcalcification candidate spots in a mammographic image consists of a plurality of image processing and computer vision procedures that find clusters of connected pixels that present characteristics which are similar to that of microcalcification in mammogram.

The step of forming candidate clusters each of which has a plurality of microcalcification candidate spots groups a plurality of microcalcification candidate spots (mammogram image pixels) that are close to each other within a certain distance into a cluster. For each cluster, attached are relevant parameters such as medical case ID, cluster ID, number of spots, properties (geometric, topological, statistical, etc.) of the spots, degree of similarity (rank, assigned later) to the true mcc, and the like.

The step of assigning ranks to the candidate clusters based on the degree of similarity between the candidate clusters and true microcalcification clusters applies classification schemes and rules to candidate clusters to find ranks; where the classification schemes and rules are trained with a plurality of true microcalcification clusters and normal (non-cancer) clusters.

The step of identifying linear structures only in the neighborhood where the candidate clusters reside applies image processing and computer vision algorithms to pixels in the candidate cluster neighborhood to detect the presence of linear structures.

The step of potentially altering the ranks of the candidate clusters for which linear structures have been identified in the neighborhood first evaluates the positions of the microcalcification candidate spots relative to the positions of the linear structures, then alters the ranks of the candidate clusters if the number of microcalcification candidate spots falling on the linear structures exceeds a certain value for the candidate clusters.

In another embodiment of the method of image linear structure detection of the present invention, the mammographic image is a digitized X-ray film mammogram in the present invention; the mammographic image is a digital mammogram captured with a computerized radiography system in the present invention; the mammographic image is a digital mammogram captured with a digital radiography system in the present invention.

The step of locating microcalcification candidate spots in a mammographic image consists of a plurality of image processing and computer vision procedures that find clusters of connected pixels that present characteristics which are similar to that of microcalcification in mammogram.

The step of forming candidate clusters each of which has a plurality of microcalcification candidate spots groups a plurality of microcalcification candidate spots that are close to each other within a certain distance into a cluster. For each cluster, attached are relevant parameters such as medical case ID, cluster ID, number of spots, properties (geometric, topological, statistical, etc.) of the spots, degree of similarity (rank, assigned later) to the true mcc, and the like.

The step of assigning ranks to the candidate clusters based on the degree of similarity between the candidate clusters and true microcalcification clusters applies classification schemes and rules to candidate clusters to find ranks; where the classification schemes and rules are trained with a plurality of true microcalcification clusters and normal (non-cancer) clusters.

The step of determining a region of interest (ROI) for each candidate cluster whose rank is not within a specified range uses the positions of the candidate spots of the candidate cluster to determine a region that encloses the candidate spots in the mammographic image.

The step of processing the ROI to generate a line mask if linear structures present in the ROI applies a combination of image processing and computer vision procedures to pixels in the ROI and generates a line mask if it is determined that linear structures present.

The step of updating the rank of the candidate cluster if it is determined that the candidate cluster is associated with the line mask first evaluates the positions of the microcalcification candidate spots relative to the positions of the line mask, then updates the ranks of the candidate clusters if the number of microcalcification candidate spots falling on the linear structures exceeds a certain value for the candidate clusters.

The step of locating a plurality of mcc candidate clusters whose characteristics resemble that of true mcc clusters consists of procedures of locating microcalcification (mcc) candidate spots in a mammographic image; forming candidate clusters each of which has a plurality of mcc candidate spots; assigning ranks to the candidate clusters based on the degree of similarity between the candidate clusters and true mcc clusters. For each cluster, attached are relevant parameters such as medical case ID, cluster ID, number of spots, properties (geometric, topological, statistical, etc.) of the spots, degree of similarity (rank, assigned later) to the true mcc, and the like.

The step of extracting ROIs in the mammographic image with the geometric parameters of the located mcc candidate clusters uses the positions of the candidate spots of the candidate cluster to determine a region that encloses the candidate spots in the mammographic image.

The step of processing the ROIs to generate line masks applies a plurality of image processing and computer vision procedures to pixels in the ROI and generates a line mask if it is determined that linear structures present.

The step of analyzing the ROIs to verify the truthfulness of the generated line masks applies image transformation/processing algorithms to pixels in the ROIs and analyzes the transformed/processed ROIs in the transformed/processed image domain to confirm the existence of linear structures that validate the generated line masks.

The step of tagging the mcc candidate clusters that are associated with the verified line masks for diagnosis evaluates the positions of the microcalcification candidate spots relative to the positions of the line mask, then updates the status of the candidate clusters if the number of microcalcification candidate spots falling in the line mask exceeds a certain value.

The following is a detailed description of the preferred embodiments of the invention, reference being made to the drawings in which the same reference numerals identify the same elements of structure in each of the several figures.

Curvilinear Structures are curvilinear appearance of blood vessels, lactation ducts, and ligaments of the breast projected on a mammogram. Vascular lines are large calcified blood vessels on a mammogram. Microcalcifications are bright spots on mammograms and usually the only signs indicating early breast cancers. Microcalcification spots appear usually in clusters, and malignant microcalcification spots usually have irregular shapes.

Computer aided breast cancer detection relies on image processing and computer vision technologies to identify distinct pixel clusters and classifies them into true microcalcifications (positives) or true negatives. Commonly to all classification technologies, false positives (false microcalcifications) exist due to various causes. Many false-positives in computer aided mammography technology are those fall on the curvilinear normal structures in digitized film-based or digital mammograms.

One embodiment of the present invention is directed to addressing the problem of detecting line structures in order to remove microcalcification false positives (mcc FPs) sitting on the curvilinear structure in a mammogram.

The curvilinear structure is a net of massive and complex curvilinear markings on a given mammogram. Due to the projection of three-dimensional breast into a two-dimensional mammogram, different parts of the curvilinear structure may have different appearances with varying contrasts. The curvilinear structure appears as a collection of broken curvilinear markings of different widths, lengths, and different contrasts to the surrounding breast tissue.

The option of pre-classification global mask generation to extract curvilinear structure may be of limited use because global curvilinear markings is a massive structure, and accurate mask extraction is not an easy task. Global mask tends to extract only a small portion of line structure or extract too many "lines".

An alternative is to identify linear structures only in the neighborhood where the candidate clusters reside. For each of the candidate clusters, a region of interest (ROI) is defined that encloses the microcalcification candidate spots of the each of the candidate clusters. This approach is to design mcc false-positive post-reduction algorithms after initial mcc candidates detection. The post reduction procedure is applied to small region (region of interest, ROI) centered around each mcc candidate cluster to avoid the unnecessary influence from the rest of the breast. It reduces processing time since the number of mcc candidate clusters are limited and only a small portion of the breast area needs to be processed, in comparison to global line mask approach.

Also note that not all mcc candidate clusters need to be processed to identify line structures. Only for those candidate clusters whose rank is not within a specified range, a region of interest (ROI) is to be determined by using the positions of the candidate spots of the candidate cluster. The determined ROI encloses the candidate spots in the mammographic image. A combination of image processing and computer vision procedures is applied to pixels in the ROI. If it is determined that linear structures present, line masks will be generated in the ROI.

The post-reduction algorithm could be in the form of extracting localized of line mask within an ROI or localized feature analysis to differentiate true positive mcc candidates from false positive mcc candidates. However, local line extraction may fail hence mcc spots sitting on these segments may not be removed. Similarly, vascular line information may not be ready without line mask extraction in localized feature analysis.

To take the advantages of both localized line mask and localized feature analysis, a combined design of localized line mask and feature analysis can be implemented to obtain a localized line mask first and then at a second step, localized feature analysis is used to remove mcc FPs further. A step is to extract a line mask inside the ROI. The line mask step may not extract all line segments due to low contrasts of some segments and avoiding extracting lines surrounding the true positives. Therefore, a second step of localized feature analysis will be used to extract features to remove these vascular false positive mcc candidates not being removed in the first step. The step of analyzing the ROIs is also used to verify the truthfulness of the generated line masks. It applies image transformation/processing algorithms to pixels in the ROIs and analyzes the transformed/processed ROIs in the transformed/processed image domain to confirm the existence of linear structures that validate the generated line masks.

The Localized Line Mask can be generated by using an Active Contour Model (ACM) that is commonly used to obtain the approximated close boundary of an object. The attractiveness of ACM is that it extracts a close boundary even in noisy images and therefore presents a connected solid object detection. Segmentation or detection of a vascular line can be obtained using ACM when considering a vascular line as a solid object.

The Localized Line Mask can also be generated by using an Expanded Edge Mask. In some vascular lines, there are clearly no visible edges in some broken portions or in one side of the vessel. The focus shifts to extract these essentially visible and high-contrast line or line edge portions because they are where mcc vascular FPs are located. The line edges can be detected using an edge detection algorithm or phase congruency method. The detected line edges will be expanded along the direction perpendicular to the line with a fixed width (or adaptive width) to obtain line mask. The other linear mcc false positives not masked out by the line mask will need localized feature analysis to be removed.

The Localized Line Mask is used to remove these vascular mcc false positives, but it should not identify and remove true mcc candidates on a mammogram. The localized line structure extraction and removal may not be adequate to remove all un-wanted line structures or may not be specific enough to retain all true mcc candidates. A localized feature analysis step may then be used to reduce mcc false positives further and keep intact of true mcc candidates.

Exemplary localized features may include the number/ratio of line/edge pixels inside a mcc cluster ROI, the average and standard deviation of line magnitudes of line/edge pixels inside a mcc candidate cluster ROI, the standard deviation of line angles of each pixel inside a mcc spot and mcc spots inside a cluster, the relationship between the properties of line and the properties of mcc candidate (assuming each mcc candidate spot as an ellipse, then the direction of small and large axis should indicate the line direction), the correlation information between previously extracted line structure and mcc spot centroid, and co-linearity of mcc spots inside a cluster. Mcc candidate spots from calcified vascular lines may be different from true mcc spots, some features may be extracted to characterize the difference.

In the present invention, localized feature analysis is incorporated after initial line mask generation to prevent true positives from being removed.

In the present invention, an adaptive size is adopted for determining an ROI for an mcc candidate cluster according to the bounding area of the involved mcc candidate cluster. Smaller mcc candidate cluster has smaller ROI size, therefore reducing the overall processing time. The width and height of an ROI can be different.

Since not every spot of a vascular mcc candidate cluster may be on the line mask due to the grouping of nearby spots into a cluster, rules to retain or reject a localized line mask may be needed. With rules, true vascular mcc FPs, such as six or seven spots on the line but one spot is not, can be removed; TPs will not be removed even a few spots of an mcc candidate cluster are on a line structure. Exemplary rules that are used to retain or reject a localized line mask are designed according to the number of spots on the line mask and the number of spots not on the line mask.

Vascular line is a linear or curvilinear segment with no dramatic angular change from one end to the other end. The perimeter of a true positive spot will be circular. Therefore, drawing an 8-direction rays from the center the spot, if the spot is of TP, the distance from the center to the surrounding line segments (the perimeter of TP) will be similar; if the spot is on a line structure, the distance from 8-directions will be different. The standard deviation (or sigma) is a way to measure the similarity of each distance in 8-direction ray intersection. The perimeter of TP is circular, the distance from center to edge will be same/similar, so sigma will be small. The larger the sigma value is, the less the line segmentation like a circle, therefore less likely to be the perimeter of a TP.

If a mcc candidate cluster is on the extracted line mask, the rank of the mcc candidate cluster is updated. An exemplary updated value is 1.0 and a new tag is added to a data file that is associated with the mcc candidate cluster. The step of tagging the mcc candidate clusters that are associated with the verified line masks for diagnosis evaluates the positions of the microcalcification candidate spots relative to the positions of the line mask, then updates the status of the candidate clusters if the number of microcalcification candidate spots falling on the linear structures exceeds a certain value for the candidate clusters.

Figure 1:
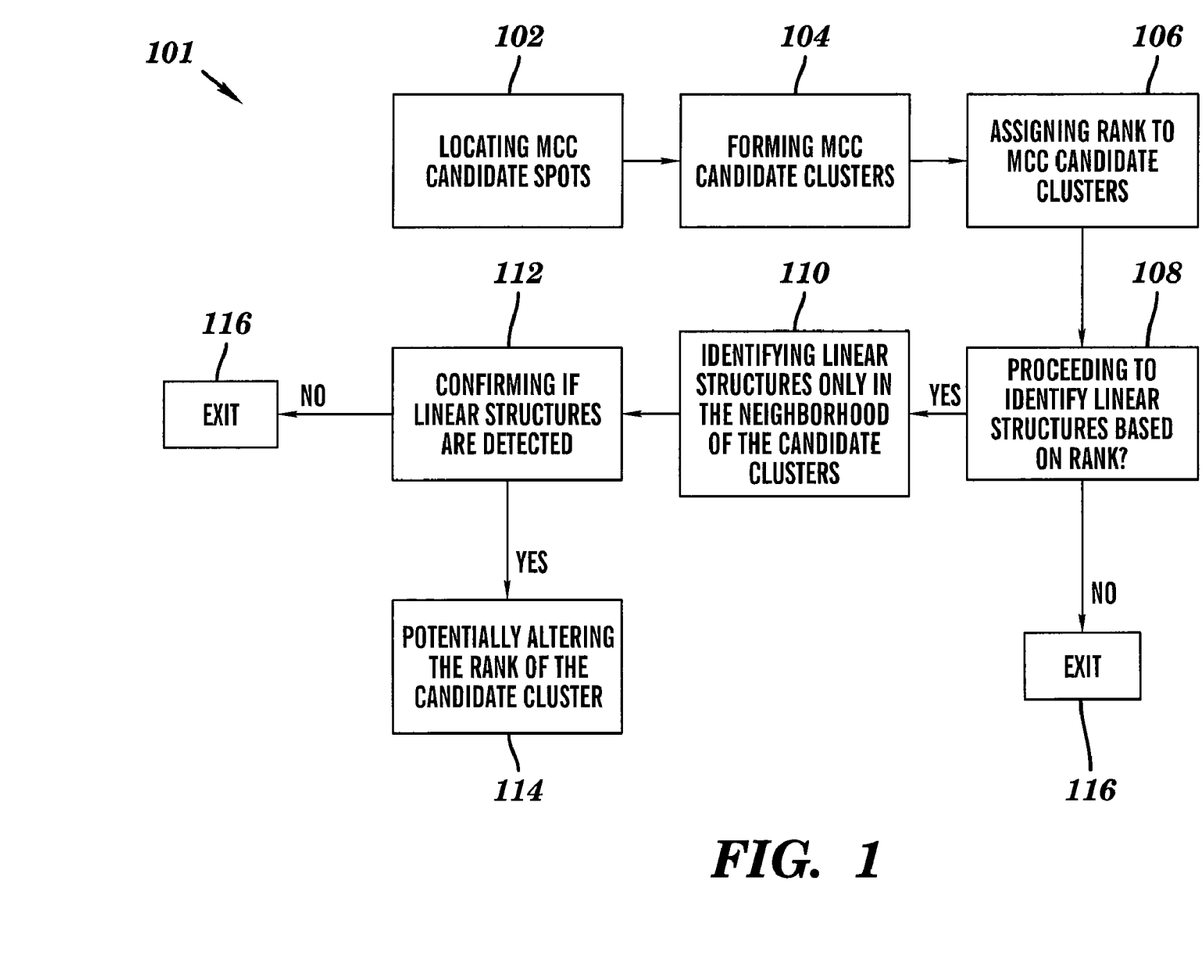
FIG. 1 is an illustration of an embodiment of the method for image linear structure detection in medical imaging for the current invention.

FIG. 1 illustrates an embodiment of a workflow 101 of the method for image linear structure detection in medical imaging for the present invention. Step 102 receives mammographic images which can be digitized X-ray film mammograms, digital mammograms captured with computerized radiography systems or mammographic images captured with digital radiography systems. In step 102, a plurality of image processing and computer vision procedures can be applied to the input mammographic images to find clusters of connected pixels that present characteristics which are similar to that of microcalcification in mammogram. Exemplary characteristics can be statistical moments derived from pixel values in intensity (including intensity derivatives), spatial frequency, and topological domains.

Step 104 forms candidate clusters using the clusters of connected pixels found in step 102. The clusters of connected pixels are also called microcalcification candidate spots. Each candidate cluster formed in step 104 has a plurality of microcalcification candidate spots that are close to each other within a certain distance.

In step 106 classification schemes and rules such as neural nets, SVM, or any other pattern recognition methods can be applied to microcalcification candidate clusters found in step 104. Ranks are assigned to the candidate clusters after classification based on the degree of similarity between the candidate clusters and true microcalcification clusters. The classification schemes and rules are trained with a plurality of true microcalcification clusters and normal (non-cancer) clusters. In a later stage, microcalcification candidate clusters are to be tagged as cancer (positive) or non-cancer (negative) based on the ranks assigned.

It is true for any type of classification schemes that candidates may be falsely classified as positive. It is well known that many false-positive microcalcification (mcc) candidates as selected by mammography CAD systems developed in the past were found to fall on the curvilinear normal structures in digital or film-based mammograms. Therefore, based on the rank (step 108), candidate clusters either proceed to exit (116) or go through subsequent steps for further verification to see if they are associated with linear structures.

In step 110, various algorithms can be applied to the neighborhood of a microcalcification candidate cluster to determine if linear structures present. An exemplary algorithm is the Localized Line Mask method discussed in the present invention. An exemplary technique to generate the line mask is to be described in detail later.

Linear structure validation criteria are employed in step 112 to assess the validity of the results identified in step 110. Exemplary criteria could be the type that relates to the geometric properties of the detected structures. If no linear structures are confirmed, the process exits (116). Otherwise, the process alters the rank of the related microcalcification candidate cluster in step 114. The altered rank signifies that the status of the microcalcification candidate cluster may be changed and the cluster may be excluded from further considerations, which is determined by the underlying CAD system design.

Figure 2:
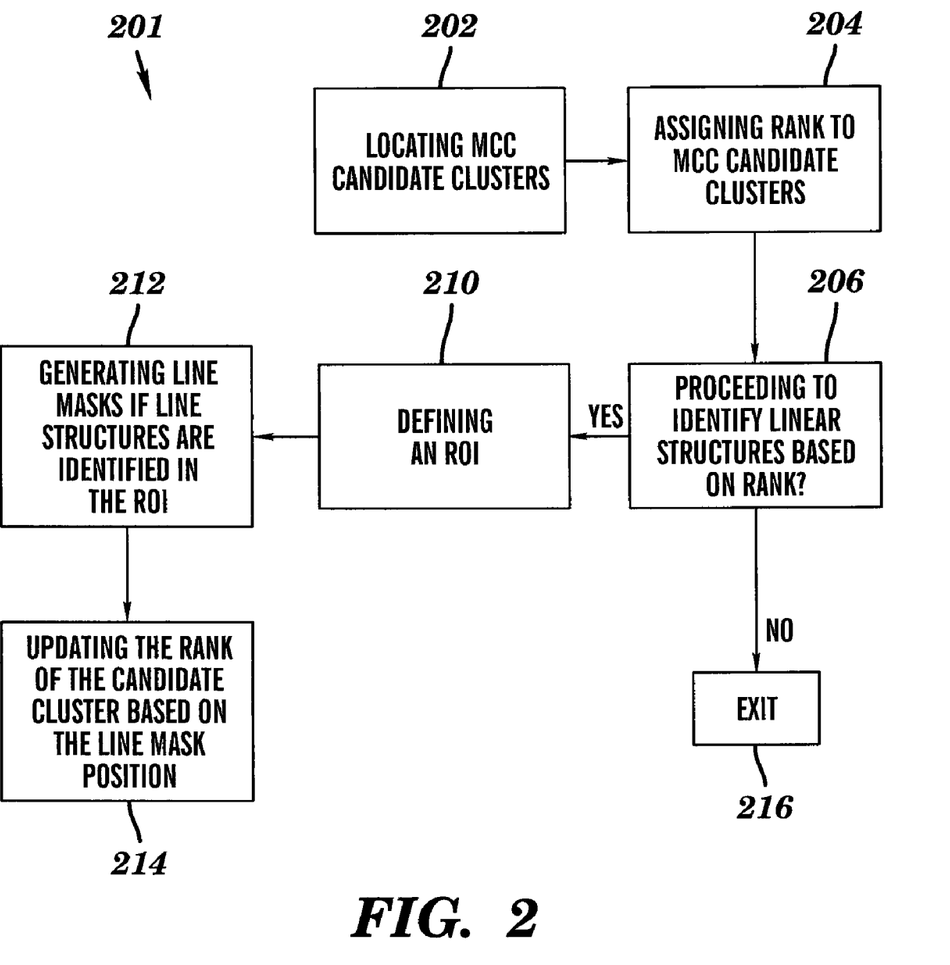
FIG. 2 is an illustration of an embodiment of the method for identifying linear structures that associated with mcc candidate clusters in mammographic images for the current invention.

FIG. 2 depicts an embodiment of a workflow 201 of the method for identifying linear structures that associated with mcc candidate clusters in mammographic images for the current invention.

Step 202 receives mammographic images which can be digitized X-ray film mammograms, digital mammograms captured with computerized radiography systems or mammographic images captured with digital radiography systems. In step 202, a plurality of image processing and computer vision procedures can be applied to the input mammographic images to find clusters of connected pixels that present characteristics which are similar to that of microcalcification in mammogram. Exemplary characteristics can be statistical moments derived from pixel values in intensity (including intensity derivatives), spatial frequency, and topological domains. Step 202 forms candidate clusters using the clusters of connected pixels found. The clusters of connected pixels are also called microcalcification candidate spots. Each candidate cluster formed in step 202 has a plurality of microcalcification candidate spots that are close to each other within a certain distance.

In step 204 classification schemes and rules such as neural nets, SVM, or any other pattern recognition methods can be applied to microcalcification candidate clusters found in step

202. Ranks are assigned to the candidate clusters after classification based on the degree of similarity between the candidate clusters and true microcalcification clusters. The classification schemes and rules are trained with a plurality of true microcalcification clusters and normal (non-cancer) clusters. In a later stage, microcalcification candidate clusters are to be tagged as cancer (positive) or non-cancer (negative) based on the ranks assigned.

It is true for any type of classification schemes that candidates may be falsely classified as positive. It is well known that many false-positive microcalcification (mcc) candidates as selected by mammography CAD systems developed in the past were found to fall on the curvilinear normal structures in digital or film-based mammograms. Therefore, based on the rank (step 206), candidate clusters either proceed to exit (216) or go through subsequent steps for further verification to see if they are associated with linear structures.

In step 210, a region of interest (ROI) is defined based on the position of the microcalcification candidate cluster in the image. The defined ROI encloses the microcalcification candidate spots of the candidate clusters with enough margins surrounding the cluster in all directions.

Various algorithms can be applied to the ROI (in step 212) to determine if linear structures present. An exemplary algorithm is the Localized Line Mask method discussed in the present invention. An exemplary technique to generate the line mask is to be described in detail in a later stage. Linear structure validation criteria are employed in step 212 to assess the validity of the generated line masks. Exemplary criteria could be the type that relates to the geometric properties of the detected structures. If linear structures are confirmed, update the rank of the related microcalcification candidate cluster in step 214. The updated rank signifies that the status of the microcalcification candidate cluster may be changed and the cluster may be excluded from further considerations, which is determined by the underlying CAD system design.

Figure 3:
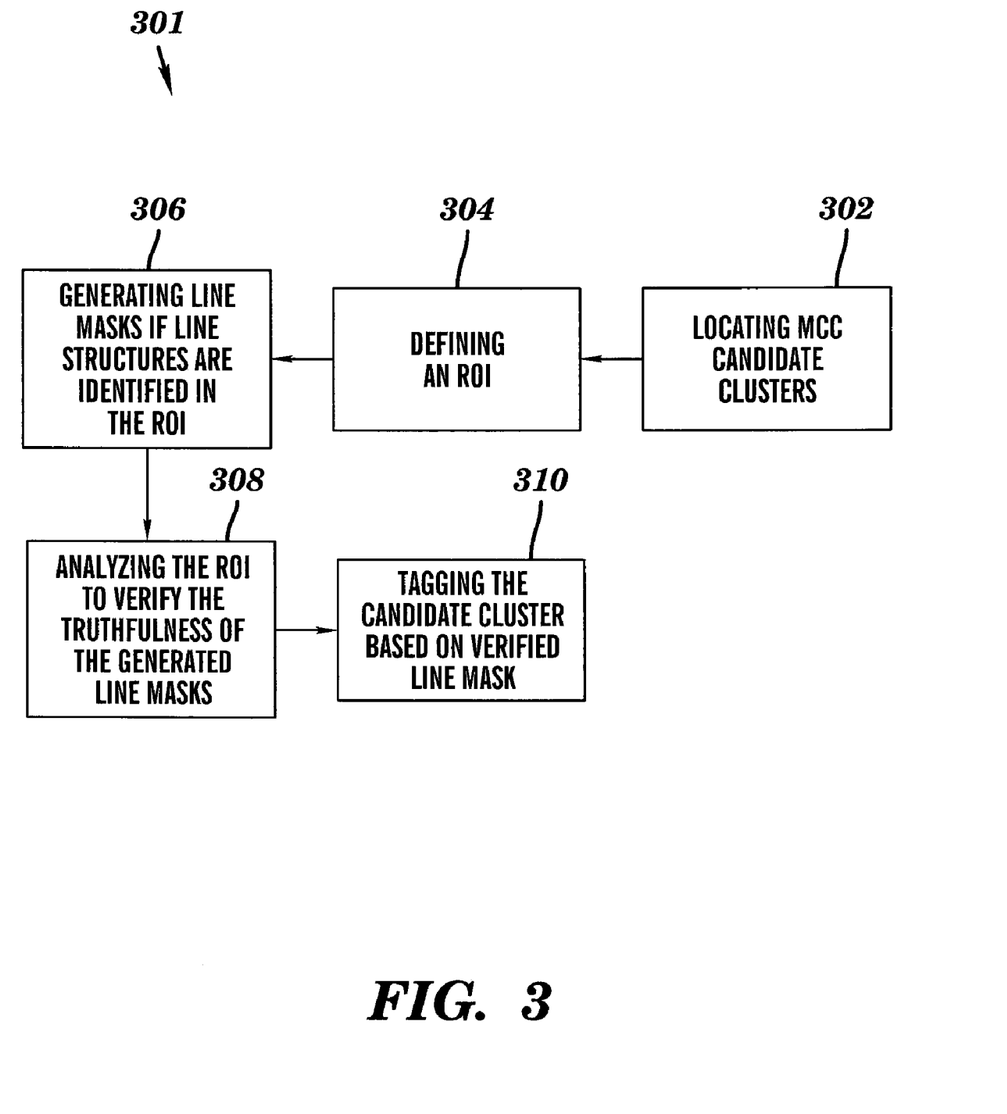
FIG. 3 is an illustration of an embodiment of the method of a mcc candidate cluster driven linear structure detection in mammographic images for the current invention.

FIG. 3 depicts an embodiment of a workflow 301 of the method of an mcc candidate cluster driven line structure detection in mammographic images for the present invention.

Step 302 receives mammographic images which can be digitized X-ray film mammograms, digital mammograms captured with computerized radiography systems or mammographic images captured with digital radiography systems. In step 302, a plurality of image processing and computer vision procedures can be applied to the input mammographic images to find clusters of connected pixels that present characteristics which are similar to that of microcalcification in mammogram. Exemplary characteristics can be statistical moments derived from pixel values in intensity (including intensity derivatives), spatial frequency, and topological domains. Step 302 forms candidate clusters using the clusters of connected pixels found. The clusters of connected pixels are also called microcalcification candidate spots. Each candidate cluster formed in step 302 has a plurality of microcalcification candidate spots that are close to each other within a certain distance.

In step 304, a region of interest (ROI) is defined with the geometric parameters of the located mcc candidate clusters in the image. The defined ROI encloses the microcalcification candidate spots of the candidate clusters with enough margins surrounding the cluster in all directions.

Various algorithms can be applied to the ROI to determine if linear structures present within the region of interest. If linear structures are detected, line masks are then generated with the detected linear structures (step 306). An exemplary linear structure detection technique is presented later.

Linear structure validation criteria are employed in step 308 to assess the validity of the generated line masks. Exemplary criteria could be the type that relates to the geometric properties of the detected structures such as concavity or convexity of the intensity profiles of the areas that support the linear structures. Exemplary rules that are used to retain or reject a localized line mask are also designed according to the number of spots on the line mask and the number of spots not on the line mask.

Based on the evaluation performed in step 308, the status of the candidate clusters is updated in step 310 with identifiable tags if the number of microcalcification candidate spots falling on the linear structures exceeds a certain value for the candidate clusters.

A preferred exemplary method of finding the Localized Line Mask is a level set formulation of functional minimization for contour finding. An exemplary functional is an active contour model (see "On edge detection edge integration and geometric active contours", by R. Kimmel et al., Proceedings of Int. Symposium on Mathematical Morphology, ISMM2002, Sydney, New South Wales, Australia, April 2002.) The active contour model is a weighted sum of three integral measures, an alignment term that leads the evolving curve to the edges (boundaries) of the desired radiation region, a minimal variance term that measures the homogeneity inside and outside the region, and a geodesic active curve term that regularizes the process. The functional is expressed as:

$$E_T = \underbrace{E_A - \beta E_H}_{external} - \alpha \underbrace{E_R}_{internal} \tag{1}$$

where $E_A$ is the alignment energy (an external term) in the form of:

$E_A(C) = \oint_C \langle \vec{V}, \vec{n} \rangle ds$ where $\vec{V}(x,y) = \{u(x,y), v(x,y)\}$ is a given vector field, and $\vec{n}(s) = \{-y_s(s), x_s(s)\}$ is the curve $C(s)$ normal.

$C(s) = \{x(s), y(s)\}$, where s is an arclength parameter. The first variation for alignment energy $E_A$ is given by:

$$\frac{\delta E(C)}{\delta C} = \operatorname{sign}(\langle \vec{V}, \vec{n} \rangle) \operatorname{div}(\vec{V}) \vec{n}$$

for a robust implementation. Let the vector field $\vec{V}$ be an image (e.g. the portal image) gradient field: $\vec{V} = \nabla I = \{I_x, I_y\}$. Therefore the first variation of the alignment term is:

$$\frac{\delta E(C)}{\delta C} = \operatorname{sign}(\langle \nabla I, \vec{n} \rangle) \nabla I \vec{n} \tag{2}$$

The second external term $E_H$ is a minimal variance energy that is expressed as $$E_H(C, c_1, c_2) = \frac{1}{2} \int\!\!\int_{\Omega_C} (I - c_1)^2 dx dy + \frac{1}{2} \int\!\!\int_{\Omega/\Omega_C} (I - c_2)^2 dx dy$$

-continued $$\text{where } c_1 = \frac{1}{|\Omega_C|}\int\int_{\Omega_C} I(x,y)dxdy,$$

$$c_2 = \frac{1}{|\Omega\setminus\Omega_C|}\int\int_{\Omega\setminus\Omega_C} I(x,y)dxdy,$$

and $\Omega_c$ is the domain inside of curve C and $\Omega$ is the image domain. The first variation of $E_H$ can be shown as $$\frac{\delta E_H}{\delta C} = \frac{1}{2}(-(I-c_1)^2 + (I-c_2)^2)\vec{n} \qquad (3)$$
$$= (c_1 - c_2)(I - (c_1 + c_2)/2)\vec{n}.$$

The internal energy $E_R(c)$ is a regularization term in the form of $E_R(c)=\oint_C g(C(s))ds$ where g can be an inverse edge indication function like $g(x,y)=1/(1+|\nabla I|^2)$. The first variation of $E_R$ can be shown as $$\frac{\delta E_R(C)}{\delta C} = -(g\kappa - \langle\nabla g, \vec{n}\rangle)\vec{n} \qquad (4)$$

$$\text{where } \kappa = \frac{-x_{pp}y_p + x_p y_{pp}}{|C_p|^3} \text{ is the curvature.}$$

The first variation of $E_T$ as a gradient decent process (curve evolution) is then given as $$C_t = [\text{sign}(\langle\nabla I, \vec{n}\rangle)\Delta I + \alpha(g(x,y)\kappa - \langle\nabla g, \vec{n}\rangle) + \beta(c_2-c_1)$$
$$(I-(c_1+c_2)/2)]\vec{n} = \gamma\vec{n}.$$

Given the curve evolution equation $C_t=\gamma\vec{n}$, its implicit level set equation is $\phi_t=\gamma|\nabla\phi|$ for $\vec{n}=\nabla\phi/|\nabla\phi|$. This is readily demonstrated as $$\phi_t\phi_x x_t + \phi_y y_t = \langle\nabla\phi, C_t\rangle = \gamma\langle\nabla\phi, \vec{n}\rangle =$$
$$\gamma\langle\nabla\phi, \nabla\phi/|\nabla\phi|\rangle = |\nabla\phi| \qquad (5)$$

An unconditionally stable implementation of Equation (5) is realized by using a locally one-dimensional (LOD) scheme employed in "Segmentation of thin structures in volumetric medical images" by M. Holtzman-Gazit et al., IEEE Trans Image Process. 2006 February; 15(2):354-63. It is experimentally demonstrated that the performance (speed and accuracy) of Equation (5) is affected largely by the numerical value of weight $\beta$ in Equation (1). In the absence of a well-defined value selection method for weight $\beta$ in Holtzman-Gazit's article, devised in the current invention is an adaptive formulation to determine an appropriate value for weight $\beta$ that is a function of the image contents and the evolution of the contour C. An exemplary formulation for the present invention can be expressed as:

$$\beta^{-1} = \frac{|(c_2-c_1)|}{|\Omega|}\left|\int\int_\Omega (I(x,y) - (c_2+c_1)/2)dxdy\right| \qquad (6)$$

$$\text{where } c_1 = \frac{1}{|\Omega_C|}\int\int_{\Omega_C} I(x,y)dxdy,$$

$$c_2 = \frac{1}{|\Omega\setminus\Omega_C|}\int\int_{\Omega\setminus\Omega_C} I(x,y)dxdy,$$

and $\Omega_c$ is the domain inside of curve C and $\Omega$ is the image domain.

Figure 4:
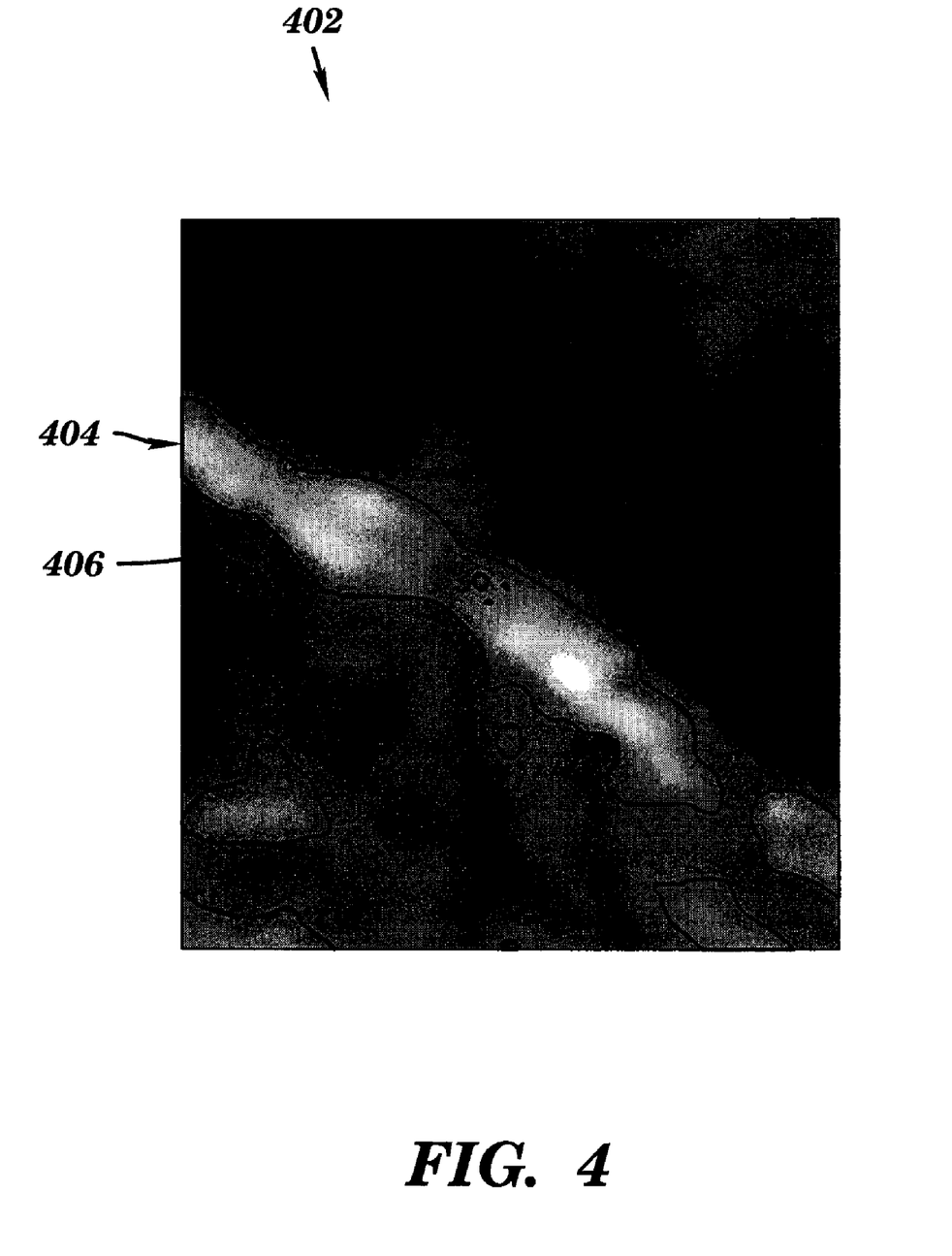
FIG. 4 is a graph illustrating a result of applying level set based contour finding algorithm to linear structures in a region of interest in a digitized mammogram according to an embodiment of the current invention.

FIG. 4 shows the result 406 of applying the above level set formulation of functional minimization for contour finding to an ROI 402 in which there is a blood vessel 404.

Figure 5:
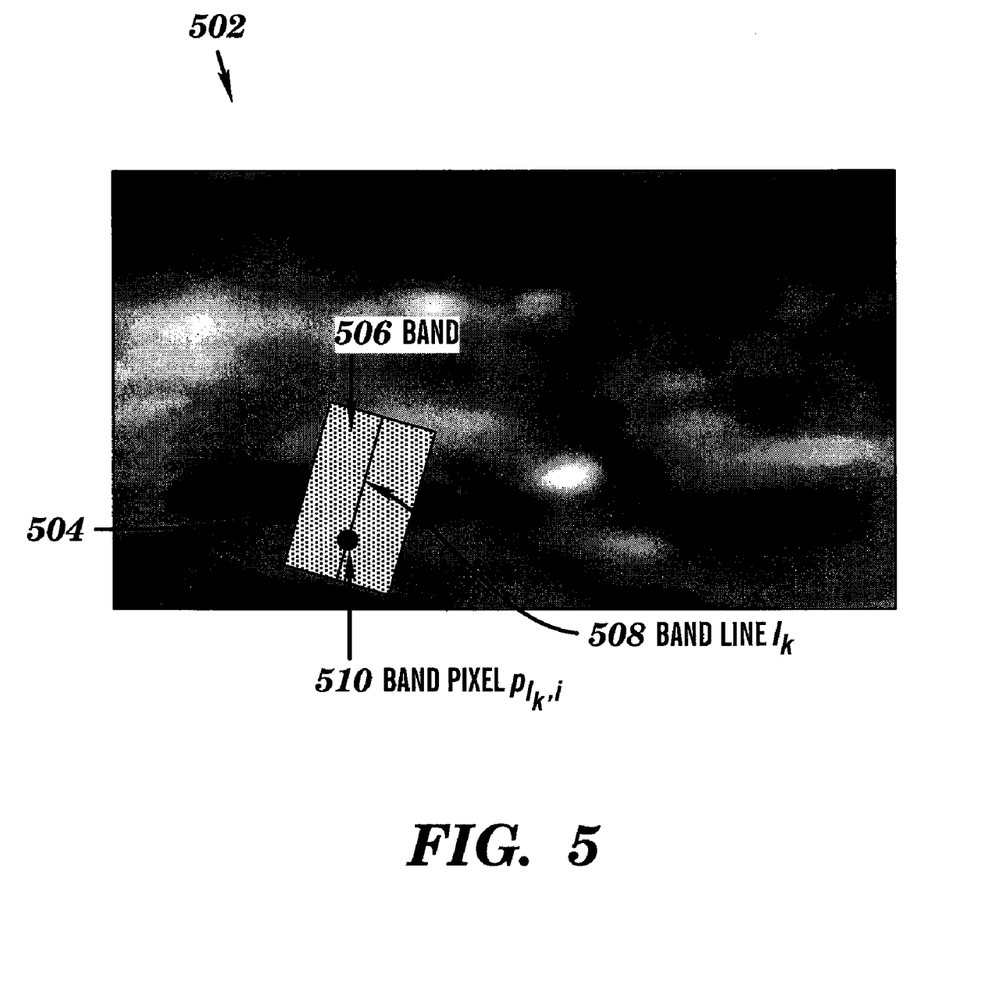
FIG. 5 is a graph illustrating a design to compute an eigenvalue band integral profile for an object in a digitized mammogram according to an embodiment of the current invention.

Noted that, in general, algorithms that perform edge detection and/or contour finding do not distinguish concave and convex objects in images. Also noted that the line structures sought in mammograms (images) appear, usually, brighter than other background contents. An exemplary ROI 502 is shown in FIG. 5 where object 504, which is not a type of line structure presently sought. To rule out this type of false line structure, constructed in the present invention is a method of verifying convexity and concavity of detected linear structures. A preferred scheme for verifying convexity and concavity of detected linear structures is an eigenvalue band integral profiling in the present invention.

Figure 6A:
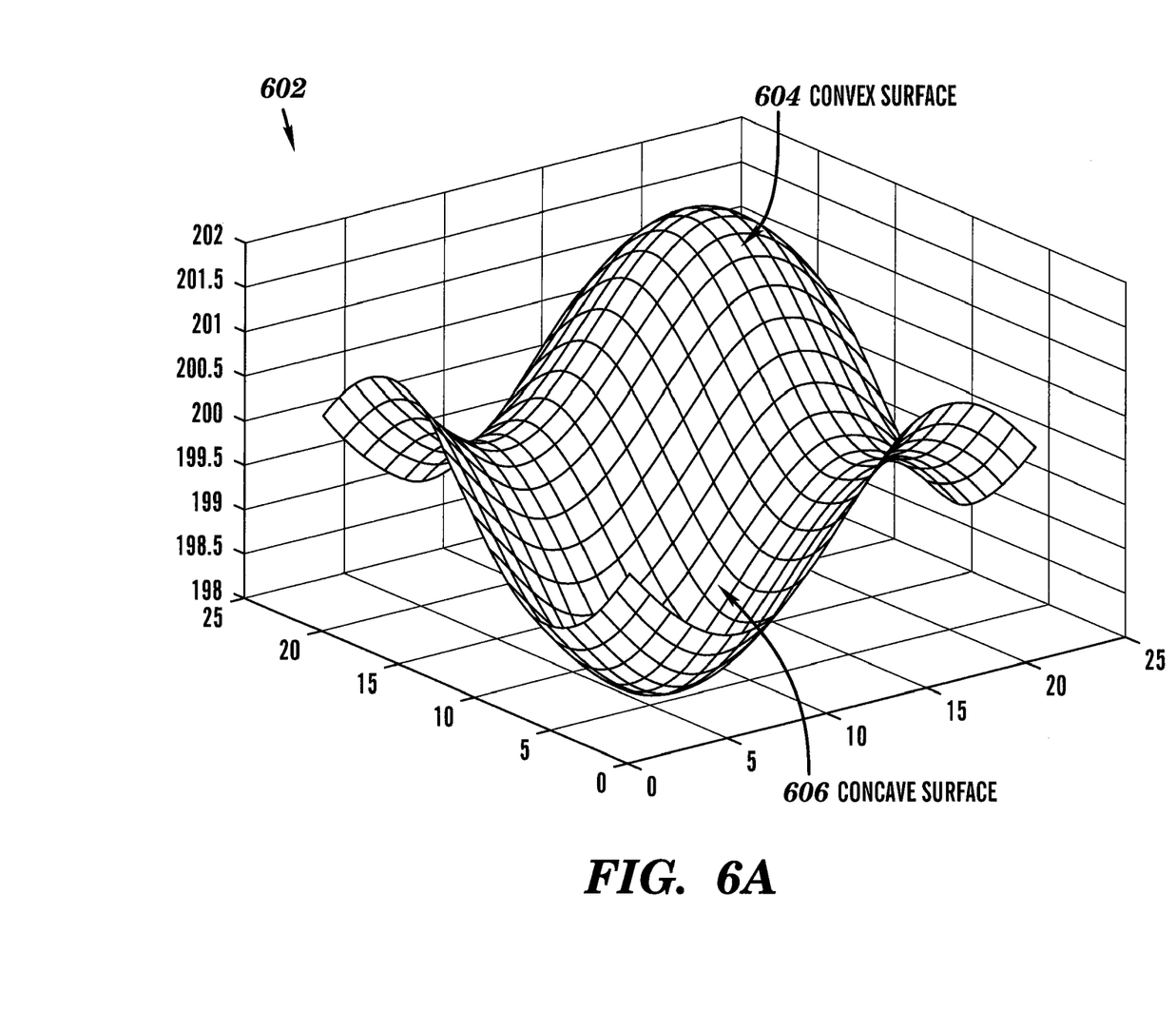
FIGS. 6A and 6B show, respectively, an illustration of an image that has a convex surface and a concave surface parts and an image of corresponding eigenvalues.
Figure 6B:
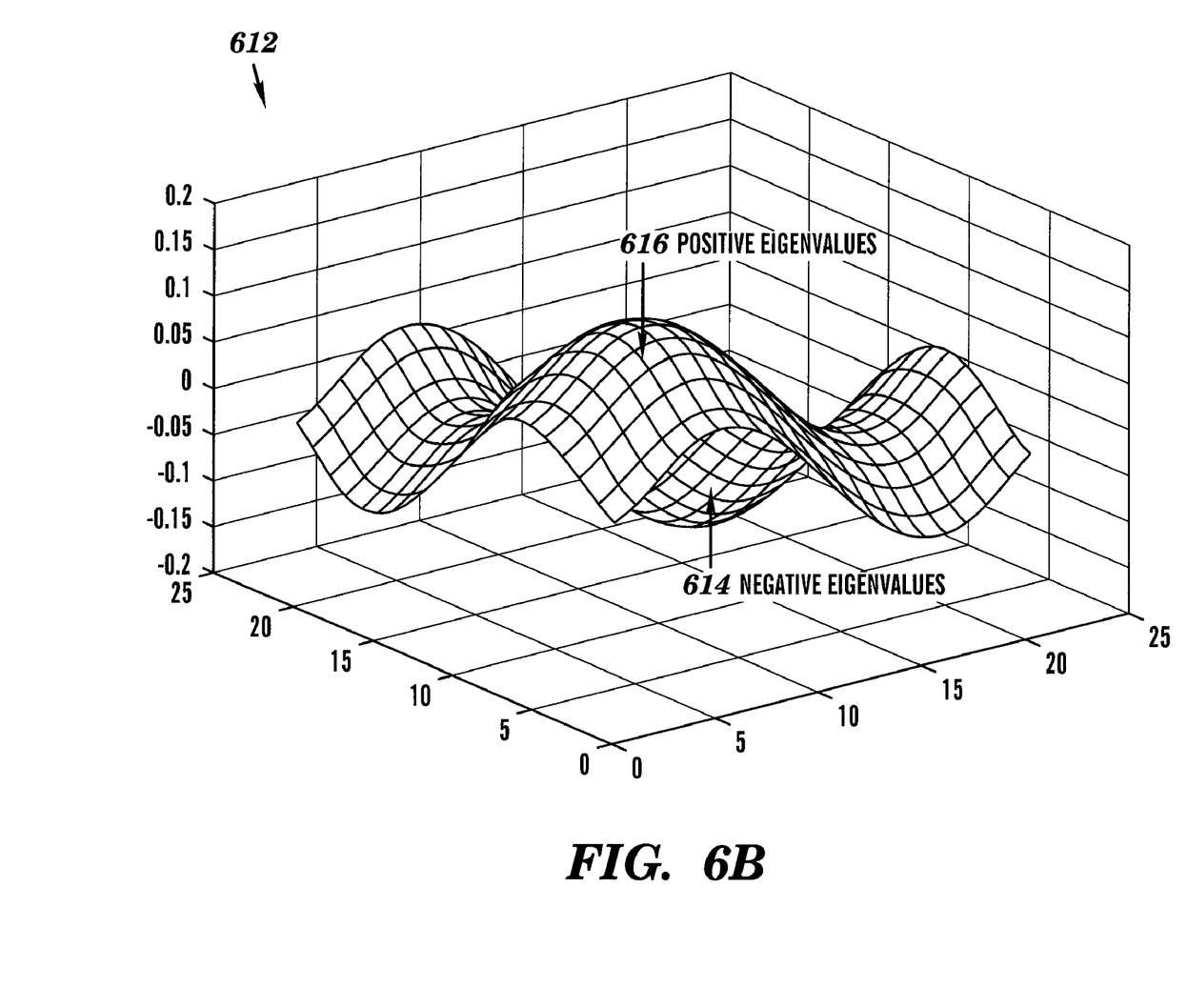

Graph 602 in FIG. 6A shows a convex surface 604 and a concave surface 606 illustrating intensity profiles for an arbitrarily image. In FIG. 6B, graph 612 shows the corresponding eigenvalue profiles of graph 602. Noted that a convex surface 604 has negative eigenvalues 614 and the concave surface 606 has positive eigenvalues 616. The steps of computing eigenvalues of a surface are described below.

Figure 7A:
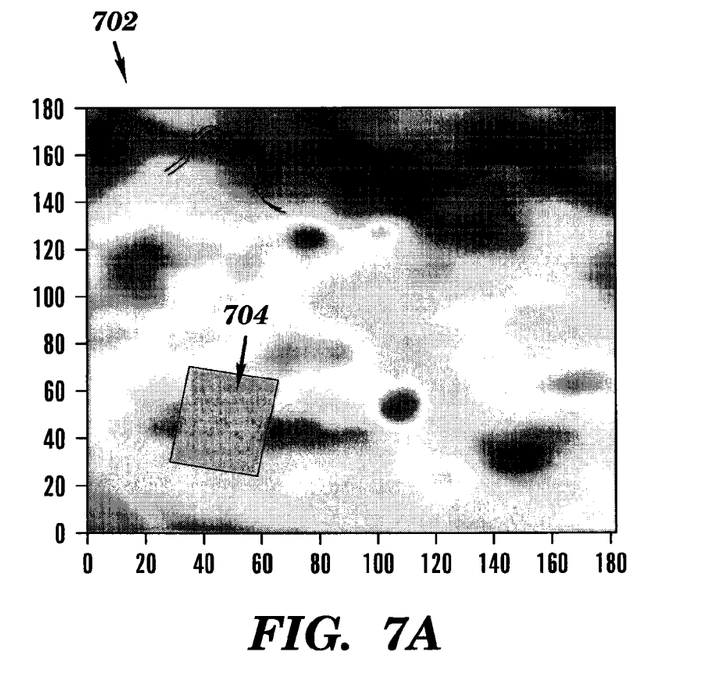
FIGS. 7A and 7B show, respectively, an illustration of an actual band that covers an object in a region of interest in a digitized mammogram and the corresponding actual eigenvalue band integral profile.
Figure 7B:
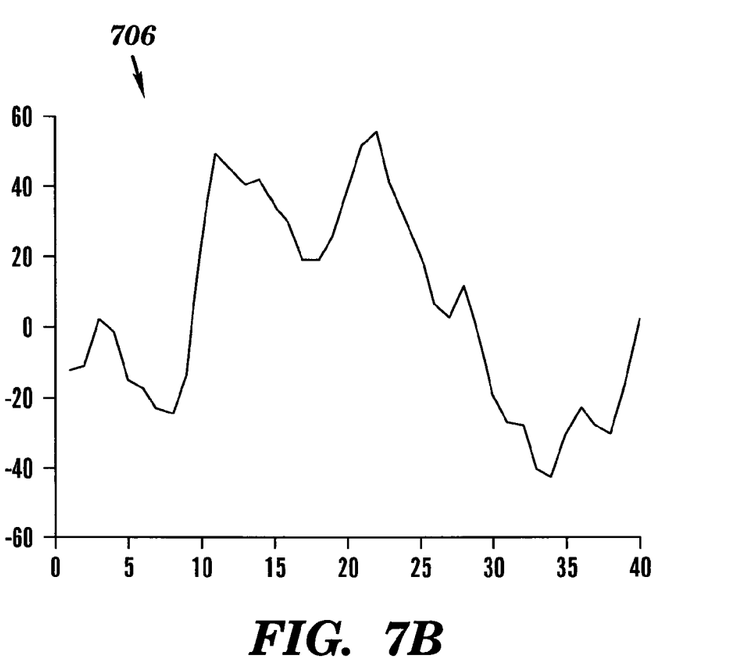

Denote ROI 502 by image I. Define a band 506 that covers part of the object (surface) 504. Denote a band line 508 in band 506 by $l_k$. Denote the position of a pixel 510 on line 508 within band 506 by $p_{l_k,i}$. Denote the code value (intensity) of pixel 510 by $I(p_{l_k,i})$. Construct a Hessian matrix $H=\{h_{m,n}\}$ for each of the pixels within the band 506 with the formula $$H = (I(p_{l_k,i})) = \{h_{m,n}\}; h_{m,n} = \frac{\partial I}{\partial x_m \partial x_n}; m \in [1,2]; n \in [1,2].$$

Where $x_m$ and $x_n$ signify two orthogonal axes of image I, and element $h_{m,n}$ is a partial derivative. Solve the following matrix equation to obtain eigenvalues $\lambda_1$ and $\lambda_2$ for every pixel $p_{l_k,i}$ within band 506:

$$H = E\Lambda E^{-1}; E = [e_1, e_2]; \Lambda = \begin{bmatrix} \lambda_1 & 0 \\ 0 & \lambda_2 \end{bmatrix},$$

where $e_1$ and $e_2$ are 2 by 1 column vectors (eigen vectors). The sign of the eigenvalues indicates the surface orientation, either concave or convex. In the present invention, to evaluate the surface orientation, a metric, S, is defined as eigenvalue band integral profile to verify object surface property (convexity and concavity). The element of the eigenvalue band integral profile, S, is computed as $$S_i = \sum_{k=1}^{W} \tilde{I}(p_{l_k,i}) \text{ where } \tilde{I} = \{\lambda_1(p_{l_k,i}) + \lambda_2(p_{l_k,i})\}$$

and W is the number of lines within the band. FIG. 7A shows an actual ROI 702 of a digitized mammogram. A band (704) covers part of an object in ROI 702. Graph 706 (in FIG. 7B) displays the actual eigenvalue band integral profile for the pixels within band 704. The positive curve of the eigenvalue band integral profile indicates that the object covered by band 704 in ROI 702 has concave type surface in terms of its intensity values.

Those skilled in the art will understand that metrics other than eigenvalue band integral profile that is devised in the present invention, such as, intensity profiles, could be employed for the purpose of verifying image object surface convexity and concavity.

The present invention is described as a method. However, in another preferred embodiment, the present invention comprises a computer program product for image linear structure detection in medical applications in accordance with the method described. In describing the present invention, it should be apparent that the computer program of the present invention can be utilized by any well-known computer system, such as the personal computer. However, many other types of computer systems can be used to execute the computer program of the present invention. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Additional aspects of such algorithms and systems, and hardware and/or software for producing and otherwise processing the images or cooperating with the computer program product of the present invention, are not specifically shown or described herein and may be selected from such algorithms, systems, hardware, components and elements known in the art.

The computer program for performing the method of the present invention may be stored in a computer readable storage medium. This medium may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It will be appreciated that variations and modifications can be effected by a person of ordinary skill in the art without departing from the scope of the invention.

The subject matter of the present invention relates to digital image processing and computer vision technologies, which is understood to mean technologies that digitally process a digital image to recognize and thereby assign useful meaning to human understandable objects, attributes or conditions, and then to utilize the results obtained in the further processing of the digital image.

The invention has been described in detail with particular reference to presently preferred embodiments, but it will be understood that variations and modifications can be effected within the scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST | |
|---|---|
| 101 | workflow |
| 102 | step |
| 104 | step |
| 106 | step |
| 108 | step |
| 110 | step |
| 112 | step |
| 114 | step |
| 116 | exit step |
| 201 | workflow |
| 202 | algorithm step |
| 204 | algorithm step |
| 206 | algorithm step |
| 208 | algorithm step |
| 210 | algorithm step |
| 212 | algorithm step |
| 214 | algorithm step |
| 216 | exit step |
| 301 | workflow |
| 302 | algorithm step |
| 304 | algorithm step |
| 306 | algorithm step |
| 308 | algorithm step |
| 310 | algorithm step |
| 402 | graph (region of interest) |
| 404 | linear structure |
| 406 | contours |
| 502 | graph (region of interest) |
| 504 | object |
| 506 | a band |
| 508 | a band line |
| 510 | a band pixel |
| 602 | graph (surfaces) |
| 604 | convex surface |
| 606 | concave surface |
| 612 | graph (eigenvalues) |
| 614 | negative eigenvalues |
| 616 | positive eigenvalues |
| 702 | graph (region of interest) |
| 704 | a band |
| 706 | eigenvalue band integral profile |

The invention claimed is:

1. A method for image linear structure detection in medical imaging, executed using a processor, comprising:
   locating microcalcification (mcc) candidate spots in a mammographic image;
   forming candidate clusters;
   assigning ranks to the candidate clusters;
   identifying linear structures in the neighborhood where the candidate clusters reside; and
   altering the ranks of the candidate clusters for which linear structures have been identified in the neighborhood.

2. The method of claim 1 wherein the step of locating microcalcification (mcc) candidate spots further comprises:
   providing a plurality of image processing and computer vision procedures that find connected pixels that present characteristics which are similar to that of microcalcification in mammogram; and
   grouping the connected pixels into microcalcification candidate spots.

3. The method of claim 1 wherein the step of forming candidate clusters further comprises:
   grouping a plurality of microcalcification candidate spots that are close to each other within a certain distance into a cluster; and
   attaching relevant parameters to the cluster.

4. The method of claim 1 wherein the step of assigning ranks to the candidate clusters further comprises:
   generating classifiers that are trained with a plurality of true microcalcification clusters and non-cancer clusters; and applying trained classifiers to the microcalcification candidate clusters and assigning ranks to classified clusters.

5. The method of claim 1 the step of identifying linear structures further comprises:
applying image processing and computer vision algorithms to image pixels including the cluster and its neighborhood;
extracting information related to linear structures from the processed image pixels; and
applying rules to extracted information to confirm the presence of linear structures.

6. The method of claim 1 wherein the step of altering the ranks of the candidate clusters for which linear structures have been identified in the neighborhood comprises:
evaluating the positions of the microcalcification candidate spots relative to the positions of the linear structures; and
altering the ranks of the candidate clusters if the number of microcalcification candidate spots falling on the linear structures exceeds a certain value for the candidate clusters.

7. A method for identifying linear structures that associated with mcc candidate clusters in mammographic images, executed using a processor, comprising:
locating microcalcification (mcc) candidate spots in a mammographic image;
forming microcalcification candidate clusters;
generating classifiers that are trained with a plurality of true microcalcification clusters and non-cancer clusters;
applying the trained classifiers to the microcalcification candidate clusters and assigning ranks to the classifiers clusters;
assigning ranks to the microcalcification candidate clusters;
determining a region of interest (ROI);
forming a line mask in the ROI; and
updating the ranks of the microcalcification candidate clusters.

8. The method of claim 7 comprising the steps of:
providing a plurality of image processing and computer vision procedures that find connected pixels that present characteristics which are similar to that of microcalcification in mammogram; and
grouping the connected pixels into microcalcification candidate spots.

9. The method of claim 7 comprises the steps of:
grouping a plurality of microcalcification candidate spots that are close to each other within a certain distance into a cluster; and
attaching relevant parameters to the cluster.

10. The A method of a microcalcification (mcc) candidate cluster driven linear structure detection in mammographic images, executed using a processor, comprising:
locating a plurality of mcc candidate clusters in digital mammograms;
extracting a region of interest (ROIs) in the mammographic image;
processing the ROIs to generate line masks;
analyzing the ROIs to verify the truthfulness of the generated line masks; and
tagging the mcc candidate clusters.

11. The method of claim 7 further comprising the steps of:
determining a candidate cluster whose rank is not within a specified range; and
using the positions of the candidate spots of the candidate cluster to define a region (ROI) that encloses the candidate spots in the mammographic image.

12. The method of claim 7 further comprising the steps of:
applying image processing and computer vision algorithms to image pixels within the ROI;
extracting information related to linear structures from the processed image pixels;
applying rules to extracted information to confirm the presence of linear structures; and
forming a line mask for the linear structures.

13. The method of claim 7 further comprising the steps of:
evaluating the positions of the microcalcification candidate spots relative to the positions of the line mask; and
updating the ranks of the candidate clusters if the number of microcalcification candidate spots falling in the line mask exceeds a certain value for the candidate clusters.

14. The method of claim 10 comprises the steps of:
generating classifiers that are trained with a plurality of true microcalcification clusters and non-cancer clusters; and
applying trained classifiers to the microcalcification candidate clusters and assigning ranks to classified clusters.

15. The method of claim 10 wherein the step of locating a plurality of mcc candidate clusters further comprises:
providing a plurality of image processing and computer vision procedures that find connected pixels that present characteristics which are similar to that of microcalcification in mammogram;
grouping the connected pixels into microcalcification candidate spots;
grouping a plurality of microcalcification candidate spots that are close to each other within a certain distance into a cluster; and attaching relevant parameters to the cluster.

16. The method of claim 10 wherein the step of extracting ROIs in the mammographic image further comprises:
determining a candidate cluster whose rank is not within a specified range; and
employing the positions of the candidate spots of the candidate cluster to define a region (ROI) that encloses the candidate spots in the mammographic image.

17. The method of claim 10 wherein the step of processing the ROIs to generate line masks further comprises:
applying image processing and computer vision algorithms to image pixels within the ROI;
extracting information related to linear structures from the processed image pixels;
applying rules to extracted information to confirm the presence of linear structures; and
forming a line mask for the linear structures.

18. The method of claim 10 wherein the step of analyzing the ROIs to verify the truthfulness of the generated line masks comprises:
applying image transformation/processing algorithms to pixels in the ROIs; and
analyzing the transformed/processed ROIs in the transformed/processed image domain to confirm the existence of linear structures that validate the generated line masks.

19. The method of claim 10 wherein the step of tagging the mcc candidate clusters comprises:
evaluating the positions of the microcalcification candidate spots relative to the position of the line mask; and
updating the status of the candidate clusters if the number of microcalcification candidate spots falling on the line masks exceeds a certain value for the candidate clusters.

* * * * *